(12) United States Patent
Luebke et al.

(10) Patent No.: US 8,958,182 B2
(45) Date of Patent: Feb. 17, 2015

(54) METHOD AND APPARATUS FOR ENHANCING ARC FAULT SIGNAL FOR DETECTION IN PHOTOVOLTAIC SYSTEM

(75) Inventors: Charles John Luebke, Hartland, WI (US); Birger Pahl, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 128 days.

(21) Appl. No.: 13/595,018

(22) Filed: Aug. 27, 2012

(65) Prior Publication Data

US 2014/0055900 A1 Feb. 27, 2014

(51) Int. Cl.
*H02H 3/00* (2006.01)
*H01L 31/042* (2014.01)

(52) U.S. Cl.
USPC .......................................... 361/42; 136/244

(58) Field of Classification Search
USPC .......................................... 361/42; 136/244
See application file for complete search history.

(56) References Cited

U.S. PATENT DOCUMENTS

| | | |
|---|---|---|
| 2011/0090607 A1 | 4/2011 | Luebke et al. |
| 2011/0141644 A1 | 6/2011 | Hastings et al. |
| 2011/0301772 A1 | 12/2011 | Zuercher et al. |
| 2013/0335861 A1 * | 12/2013 | Laschinski et al. ............... 361/2 |

* cited by examiner

*Primary Examiner* — Scott Bauer
(74) *Attorney, Agent, or Firm* — Rader, Fishman & Grauer PLLC

(57) ABSTRACT

A photovoltaic (PV) system includes a string of at least one PV module, and an arc fault detector (AFD) electrically coupled to the string. The AFD is configured to detect a non-DC electrical current that occurs within the string, and cause electrical contacts within the PV system to open as a result of the detected non-DC electrical current. The system includes a capacitor electrically coupled to the string and to the AFD such that the non-DC electrical current passes through the AFD and the capacitor.

20 Claims, 5 Drawing Sheets

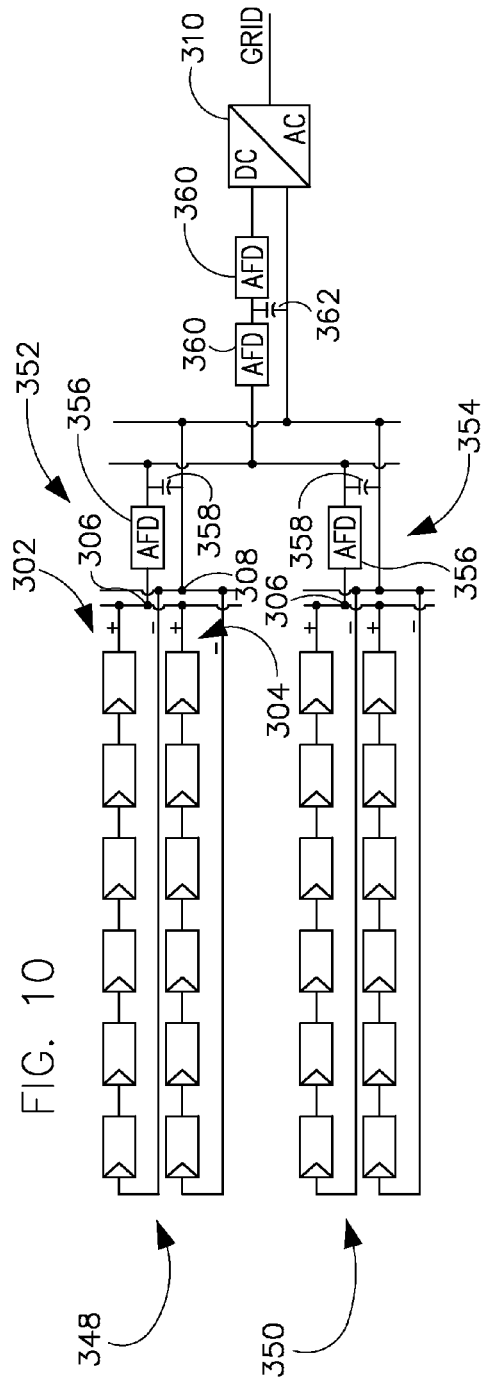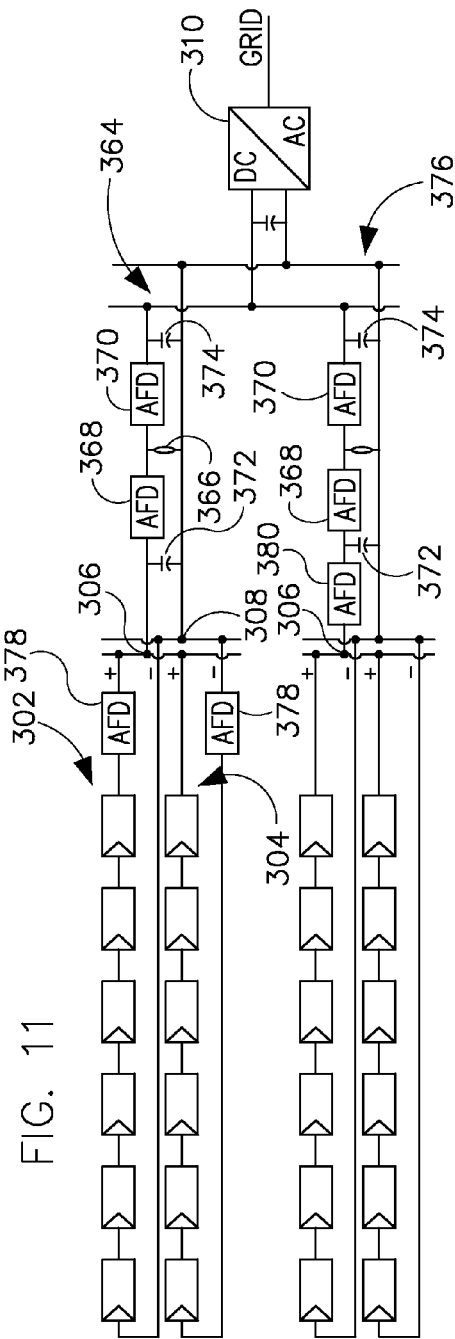

METHOD AND APPARATUS FOR ENHANCING ARC FAULT SIGNAL FOR DETECTION IN PHOTOVOLTAIC SYSTEM

BACKGROUND OF THE INVENTION

The present invention relates generally to DC electrical systems, and more particularly, to a method and apparatus for enhancing an arc fault signal for detection in a photovoltaic (PV) system.

The US and other countries have been experiencing record numbers of PV installations in recent years. In one recent year, for instance, the US experienced 339 MW of grid-connected PV during the first 6 months of the year, which represents a 55% increase over the 435 MW that was installed in the entire previous year. Not only has the number of systems increased dramatically in recent years, but the number of large scale systems has increased as well.

Generally, as known in the art, a PV system includes individual solar modules that are connected in series to form a string of, typically, 8-12 modules. A group of strings are connected in parallel in a combiner box, which typically includes a fuse for each positive string wire, and the fuse(s) feed a positive bus bar. Negative wires are also collected within the combiner box to form a negative bus. Conductors sized to handle the combined current and voltage produced at the combiner boxes carry DC power to a master combiner (which may also be regarded as an array combiner or a re-combiner), where combiner box outputs are combined in parallel. Output from one or more master combiners travels through large conductors to a central inverter, and DC power from the master combiner is output as AC power from the inverter. The inverter output is fed to a transformer that converts the output AC voltage to the utility's transmission voltage.

PV systems are expected to be highly robust and reliable for at least twenty years of operation. However, like many high voltage electrical systems, PV systems are susceptible to failure due to, among other things, arcing that can occur in the system. Arcing is a luminous discharge of electricity across an insulating medium, usually accompanied by the partial volatilization of electrodes. An arc fault is an unintentional arcing condition in an electrical circuit and can be caused by, for instance, worn conductor insulation, exposed ends between broken conductors, faulty electrical connections, or loose connections where conducting elements are in close proximity to each other, as examples. The plasma formed during an arcing fault can reach temperatures in excess of 5000 degree C. in a very localized area. This heating can be sufficient to melt surrounding components that are made of plastic or metal, such as fuse holder, parts of disconnect switches, and even the combiner box enclosure itself. This can lead to injury, equipment and property damage, and fires due to ignition of building or PV materials, threatening the loss of building contents and occupant safety.

PV systems are at risk of developing a fault due to the very large number of connections in the system. Thousands of connections can exist in a PV system, giving thousands of opportunities for poor connections to develop over time. A large PV system can have over one hundred combiner boxes, as an example. Thus, there can be thousands or even many thousands of opportunities for faults to occur. Bus bar connections are typically bolted together, and there can be any number of these bolted structures within each combiner box. Within a combiner box, field terminated strings and bus feed wiring particularly have a high potential for developing loose connections, and bus bars and associated termination hardware also have the potential to become loose through electrical and thermal cycling. The risk of developing a fault is even higher for PV strings where the signal needs to propagate down the PV wiring, through PV connectors, as well as through PV module ribbon and cell interconnections.

More so, PV systems are particularly at risk because of damage from sun, wind and weather that can occur over system working life and from the conditions that occur where PV systems are typically installed. That is, the relatively harsh conditions on building roofs, in open fields, etc. . . . can lead to physical damage and accelerated aging of the PV system. Exposure to wind, harsh winter cold and extreme summer heat can weaken connections anywhere throughout the system, causing loose connections. And, because of the dramatic growth in the number of deployed PV systems in recent years, the risk of fire and other damage has only increased. In fact, PV fires have been reported in recent years that have been traced back to component overheating and arcing, particularly caused by loose connections.

Until recently and before the dramatic growth in the number and sizes of PV systems, the risk of fire has been relatively low. And, because of the various types of possible failure modes of PV systems, protective devices employed have generally been directed toward the types of failure modes that are most easily and cost-effectively addressed. Thus, some of the early types of protection employed in PV systems has been in the strings of modules and in the combiner boxes themselves. Known practices thus included placement of an overcurrent protective device (i.e., a fuse) at the load end of a string, as an example. Known combiner boxes as well have included fuses on one or both of the positive and negative conductors that are coupled to the strings. In the event of a short, the fuses placed in such known systems provides a base level of protection against fire, and significant portions of the array connections are provided this base level of protection.

However, placing fuses within the strings and the combiner boxes does not detect arc faults or stop strings or string arrays from generating energy under an in-circuit (e.g., series) arc fault or most short circuit (e.g., parallel) arc faults which can result in fire. Fuses at the load end of a string do not prevent such a fault.

As such, more sophisticated arc fault protection devices have been developed that detect an arc and interrupt the flow of energy before a fire is able to occur. One known device known as an arc fault circuit interrupter (AFCI) includes a number of separable contacts that are responsive to the arc fault detector. Typically, in a DC electrical circuit such as a PV system, a base line of electrical noise exists in the DC power feed (e.g., DC supply or DC return). However, when an arc occurs, a broadband high frequency electrical signal is generated due to the changing nature of the arc plasma. In other words, when an arc is initiated it manifests itself as a broadband AC noise generated on an electrical conductor that can propagate along the PV electrical circuit. As such, in this known device, by selective placement of high frequency detection circuits and selective placement of the separable contacts, the risk of fire can be significantly reduced because the arc can be detected in the very early stages of development.

However, because of the types of electrical devices in a PV circuit, the detectable high frequency components associated with an arc can become attenuated and may not be detectable, at least in the early stages of arc fault development. Typically, for instance, the capacitance within an inverter/load provides low impedance for the high frequency (HF) current generated by the arc fault. DC/DC converters, transformers, inductors, EMI filters, and the like that are between the PV array (power source) and the inverter (load) can cause the HF current to attenuate or not propagate. That is, between where the arc fault occurs and where the detection occurs, and because of the multiple electrical paths within a PV system, the high frequency signal generated from the arc fault can attenuate or not propagate and be undetectable. Thus, in this known system, although a significant degree of protection against arc faults can be provided, it is possible that attenuation within the PV system precludes detection at some AFD locations during the development of the arc fault and a fire can nevertheless develop.

As such, it would be desirable to have a system and method capable of enhancing detection of broadband high frequency components generated in an arc fault within a DC electrical system and particularly within a PV system.

BRIEF DESCRIPTION

The present invention provides a system and method for improving detection of a high frequency electrical signal generated within a DC electrical system from an arc fault.

In accordance with one aspect of the present invention, a photovoltaic (PV) system includes a string of at least one PV module, and an arc fault detector (AFD) electrically coupled to the string. The AFD is configured to detect a non-DC electrical current that occurs within the string, and cause electrical contacts within the PV system to open as a result of the detected non-DC electrical current. The system includes a capacitor electrically coupled to the string and to the AFD such that the non-DC electrical current passes through the AFD and the capacitor.

According to another aspect of the present invention, a method of manufacturing an arc fault detection system for a photovoltaic (PV) detector includes coupling an arc fault detector (AFD) to a string of PV modules, wherein the AFD is configured to cause electrical contacts within the PV system to open if an arc fault is detected, and coupling a capacitor to the AFD and to the string of PV modules such that the high frequency electrical current passes at least in part through the AFD and the capacitor.

In accordance with a further aspect of the present invention, a protective circuit for a photovoltaic (PV) system includes an arc fault detector (AFD) coupled to a first string of PV modules, and a capacitor coupled to the first string of PV modules and to the AFD such that a high frequency broadband electrical current generated in the string of PV modules passes through the AFD and the capacitor.

Various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention.

FIG. 10 illustrates an alternate embodiment of the invention for protecting individual strings, the full array, and the inverter of the PV system with different arrangements of AFDs and capacitors, according to an embodiment of the invention.

FIG. 11 illustrates an alternative embodiment having different arrangements of AFDs and capacitors, according to an embodiment of the invention.

DETAILED DESCRIPTION

The present invention relates generally to a system and method for detecting arcing faults in a photovoltaic (PV) system.

Figure 1:
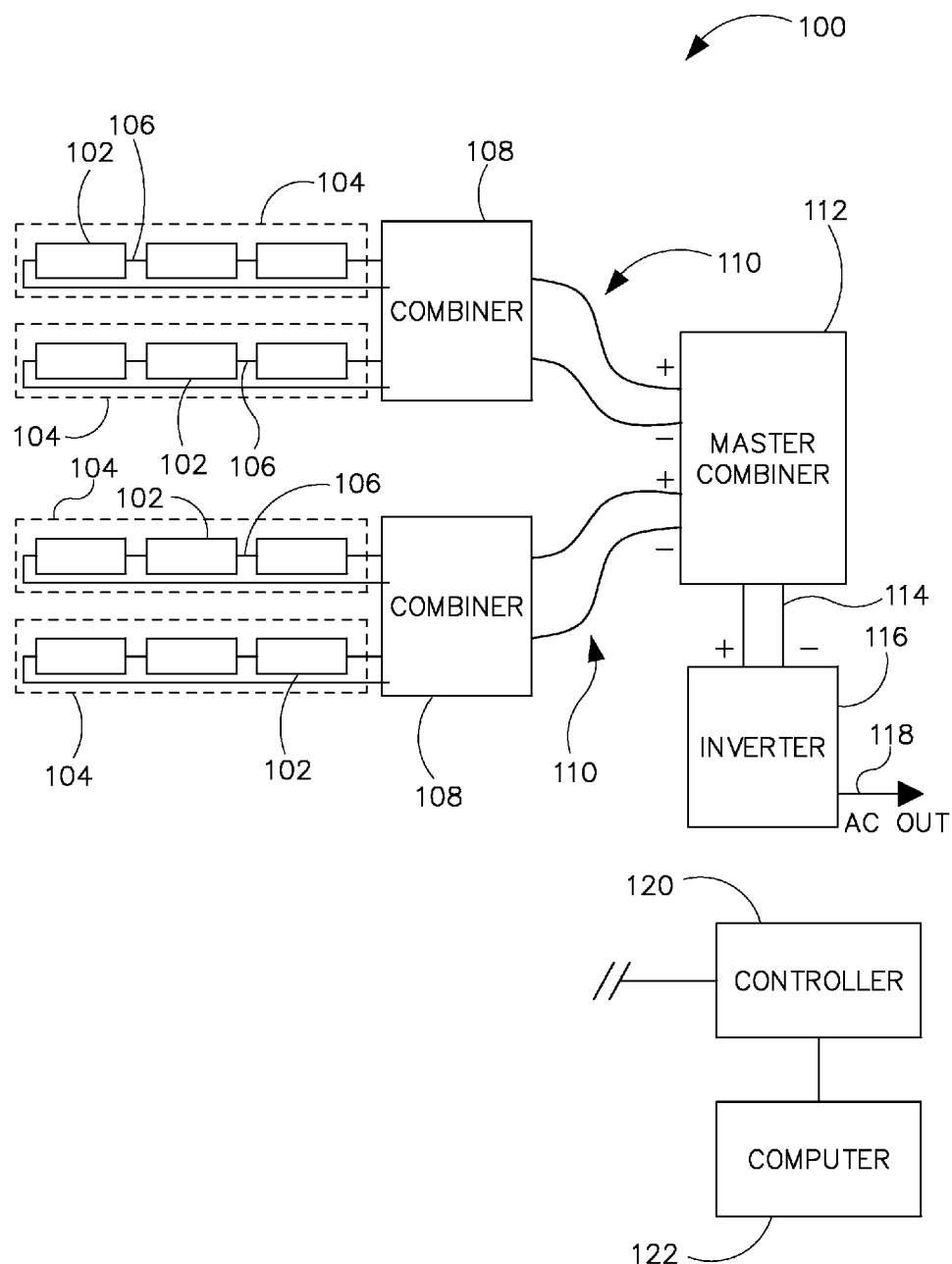
FIG. 1 is a photovoltaic (PV) system incorporating embodiments of the invention.

Referring to FIG. 1, a photovoltaic (PV) system 100 includes individual PV modules 102 that are arranged as module strings 104 which, in the illustrated case, are linear strings having three modules 102 in each. As known in the art, the number of modules need not be limited to three as illustrated, and is not limited to a linear arrangement, but may include any number of modules arranged to provide DC electrical power when incident radiant energy from the sun impinges thereon.

module electrical leads 106 are provided between modules 102 that carry electrical power, as it is collected in each module 102 when solar energy shines thereon, to a combiner 108. Combiner 108 is configured, as will be further illustrated, to collect DC electrical power from a few to several (or more) strings of solar modules, and combine the output in a combiner bus bar. As shown in FIG. 1, multiple combiners 108 may be included in system 100 (two of which are illustrated) and outputs therefrom 110 are fed into a master combiner 112 (otherwise known as an array combiner). DC electrical energy from master combiner 112 thus includes DC electrical energy from multiple PV modules 102, arranged in strings 104, which are combined in combiner 108, and output to master combiner 112. As such, master combiner 112 includes, in one embodiment, all modules 102 in system 100, leading to potentially very high total power output of several kW or more during peak energy production. DC electrical power from 112 is output as total system power 114 to an inverter 116. Inverter 116 outputs AC power 118 which may be used for residential or other purposes, or output to the electrical grid, as known in the art.

As known in the art and as will be further illustrated, modules 102 arranged as strings 104 include typically many electrical connections. Strings 104 combine into combiner 108, adding typically many more electrical connections, and when combiners 108 are combined in master combiner 112 and output to inverter 116, still more electrical connections are typically included. Thus, in the system illustrated, typically many electrical connections are included that are susceptible to becoming loose and resulting in arc faults, as described.

System 100 includes a controller 120 that receives, in one embodiment, instructions for operation, system safety functionality, etc. . . . by computer 122. In one embodiment, controller 120 and computer 122 provide system functionality for automated system operation, manual operation of control, system monitoring, power output monitoring, efficiency, measured solar influx, etc. . . . as is known in the art. Controller 120 and computer 122 provide control features for operation of embodiments of the invention.

In addition, although FIG. 1 illustrates a PV system as is commonly understood within the art, it is contemplated that other PV system arrangements may be included as well, according to embodiments of the invention. For instance, in an alternative embodiment, a PV system may include additional sub-systems, each of which resembles system 100 as illustrated. That is, much larger PV systems may incorporate embodiments of the invention that may include multiple systems 100. System 100 as illustrated may be a sub-system configured as illustrated but as part of a much larger overall DC power supply system comprised of many systems 100, each having its own master combiner 112 and inverter 116. In other words, there may be several systems 100 within a much larger system for PV operation, and the invention is not to be limited to the system 100 illustrated in FIG. 1. In fact, any such arrangement of PV components may be contemplated, according to the invention, in which PV modules are arranged to output power to an inverter, regardless of whether and how such modules are arranged as strings, with combiners, and with master combiners.

Figure 2:
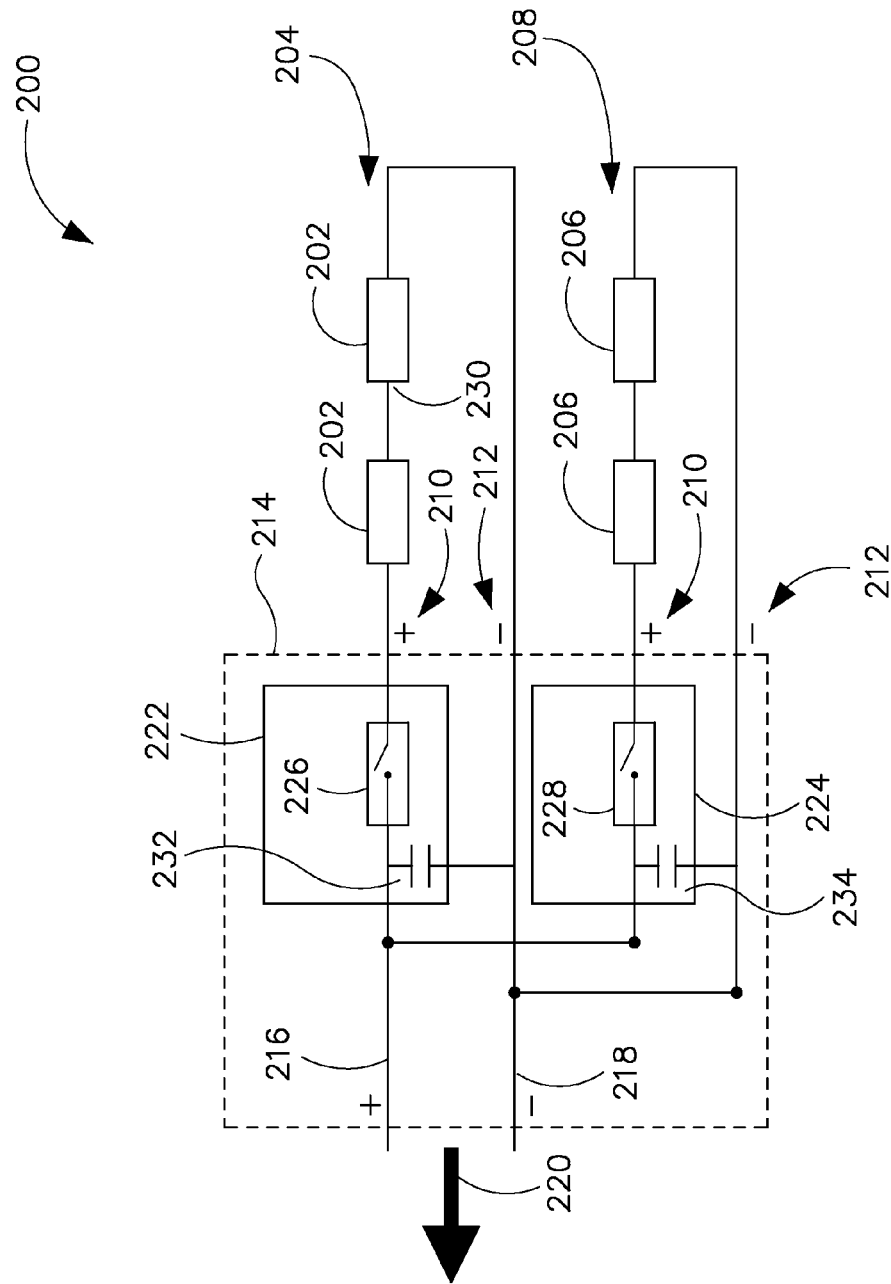
FIG. 2 illustrates a portion of a PV system having a capacitor that corresponds to individual strings of the PV system, according to an embodiment of the invention.

Referring now to FIG. 2, a portion of a PV system 200, such as PV system 100 of FIG. 1., is illustrated in order to illustrate an embodiment of the invention. System 200 shows a two PV modules 202 arranged in a first string of modules 204 and a second set of two PV modules 206 arranged in a second string of modules 208. Each string 204, 208 has a respective positive polarity 210 and a negative polarity 212. Strings 204, 208 are fed into a combiner box 214 having a positive polarity output 216 and a negative polarity output 218 that output power from strings 204 and 208 in a single set of terminals to 220 a master combiner box and beyond to a DC-AC power inverter (master combiner box and inverter not shown). As known in the art, each string 204, 208 may include more than the two modules illustrated in each (202, 206), and as also known in the art, combiner box 214 may include more than the two strings (204, 208) illustrated. Overcurrent Protection (e.g., fuses, circuit breakers) are not shown. This functionality could be contained within the string protector.

First string 204 includes a string protector 222, and second string 208 includes a string protector 224. String protectors 222, 224 are, in one embodiment, arc fault detector (AFD) circuits that include respective separable contacts 226, 228 that are caused to open when an arc fault occurs and is detected therein. For instance, separable contacts 226, 228 include but are not limited to a circuit breaker or a general electrical disconnect as known in the industry. Contacts 226, 228 may also include a semiconductor device, as well, as another example, that could include a FET or IGBT. Typically, when an arc is struck a high frequency electrical current or signal is generated, also referred to as a non-DC electrical current or signal or a broadband high frequency signal. For instance, if an arc fault occurs in a connector 230 of one of modules 202, then a current excursion (i.e., a high frequency electrical current) may result which, when detected by string protector 222, causes contactors 226 to open, thus avoiding a risk of fire. However, the broadband high frequency electrical signal generated can become attenuated as it passes through string 204, or not propagated if there is no low impedance circuit path. Because string 204 may include numerous modules 202 (beyond the two illustrated), the high frequency signal can pass through several modules, connections, and a length of electrical conductor that can stretch for up to several meters in some instances. As such, according to the invention, string protector 222 includes a capacitor 232 that effectively provides a low impedance for non-DC electrical signals to pass through and to string protector 222.

As known in the art, capacitors do not typically pass DC electrical current and thus, under normal operation the presence of capacitor 232 does not affect performance of the DC system. Thus, in normal operation when solar energy falls upon modules 202, 204, the output is a DC current that passes to combiner box 214, through string protector 222 (contactor 226 is thus closed), to terminals 216, 218 and beyond 220. When an arc fault occurs at for instance a loose connection such as connector 230, a high frequency electrical signal is generated that passes through system 200 and to string protector 222.

Without capacitor 232, it is possible as known in the art that the string protector 222 may readily detect the high frequency signal generated from arcing at connector 230 but such detection is dependent on the distributed impedance within the PV system. However, it is also possible that system capacitance due to the master combiner and beyond 220 presents a resistance to passage of the high frequency signal generated at the arcing connector 230 from being detected. That is, although it may not always be the case, without capacitor 232 the signal generated due to the system capacitance may be attenuated and thus not detected in string protector 222. In other words, although the signal generated by an arc fault may be attenuated, in many instances the signal may still be detected without capacitor 232. However, with the presence of capacitor 232, system capacitance beyond terminals 216, 218 is effectively decoupled and capacitor 232 effectively serves as a low impedance for the high frequency signal generated due to the arcing fault at loose connection 230. In other words, capacitor 232 serves to couple, or enhance coupling, between the string 204 and its AFD 226. Similarly, a second capacitor 234 may be included with second string 208 to provide protection thereto in a similar fashion as described with respect to capacitor 232 and first string of modules 204. This also improves cross-talk issues by reducing or eliminating the propagation of a high frequency signal generated in one string (from an arcing fault) into another string. The strings are decoupled, a fault in one string will not trigger the arc fault detector to falsely trip on another. In general the capacitors that are provided in the embodiments described herein serve to couple the string with which they are connected to a respective AFD.

Further, as known in the art the amount of high frequency signal that reaches the string protector 222 is dependent at least in part upon the magnitude of the high frequency signal generated at arcing connection 230. As such, by lowering the amount of high frequency impedance by the use of capacitor 232, not only is the likelihood of detection increased, but it is also likely that the high frequency signal will be detected earlier in the process of arc formation. The magnitude of the high frequency signal generated from arcing connection 230 may start as a relatively low signal when the loose connection first develops. Thus, if no capacitor 232 were present string protector 222 may still detect the presence of arcing connection 230, but only after the arc has become dangerously well established. However, with capacitor 232 and the accompanying decreased high frequency impedance, a lower attenuation also occurs from arcing fault 230 to circuit return line, leading to earlier detection and a quicker response when a arcing fault first begins to develop. The embodiment of FIG. 2 illustrates therefore a self-contained solution but adds cost and space of a high voltage capacitor to each AFD. The detection becomes directional, in that arcs closer to the array are typically detected.

Other embodiments of the invention are illustrated in subsequent figures. For instance, referring to FIG. 3 system 200 is illustrated having strings 204, 208 and respective modules 202, 206. System 200 includes string protectors 222, 224 with respective contactors 226, 228. As stated with respect to FIG. 2, string protectors 222, 224 may detect arcing faults within system 200 even without the presence of the capacitors 232, 234. In this embodiment, location of a capacitor may be placed in a different location of system 200 compared to that of FIG. 2. Known systems may typically include a DC/DC converter 236 within combiner box 214 that receives a combined DC power from strings 204, 208 and outputs a different DC voltage, according to system design. That is, power generated within strings 204, 208 may be at a first voltage that is then stepped up to a higher voltage before being passed to a DC-AC inverter. In this embodiment, however, a capacitor 240 is included at the DC/DC converter to provide a low impedance for high frequency signals to pass through AFD 226, 228. Thus, in this embodiment, instead of providing capacitors for each string 204, 208, one capacitor 240 may instead provide a low impedance path for string level detection of a high frequency arc fault signal. That is, in this embodiment, high frequency AC current generated in either string 204, 208 due to a arcing fault, can be caused to flow to AFD 226, 228 via capacitor 240. Thus, according to this embodiment, only one capacitor is provided per combiner box that can be integrated into the single DC/DC converter. The detection is directional and arcing faults closer to the array are detected.

Figure 3:
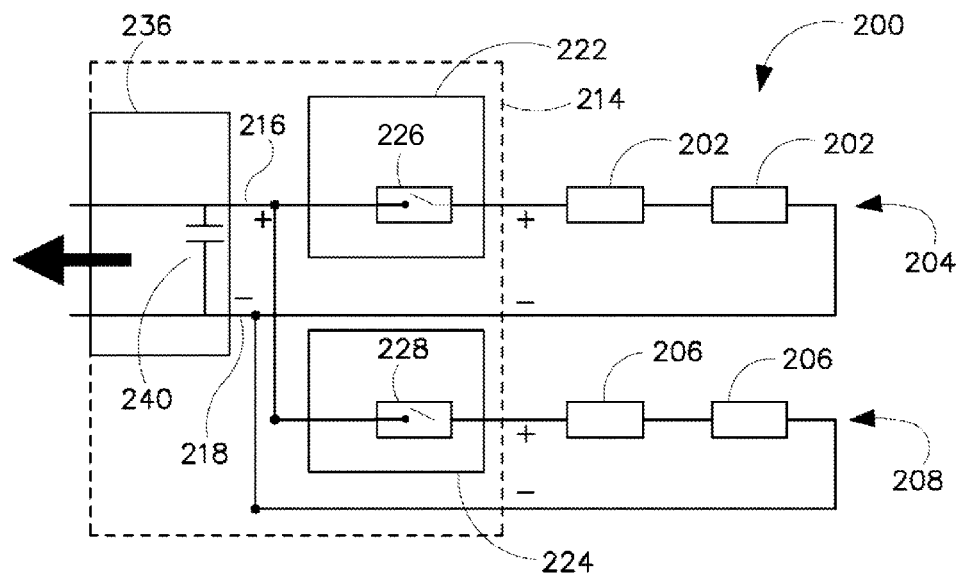
FIG. 3 illustrates a portion of a PV system having a capacitor that corresponds to several strings of the PV system, according to an embodiment of the invention.
Figure 4:
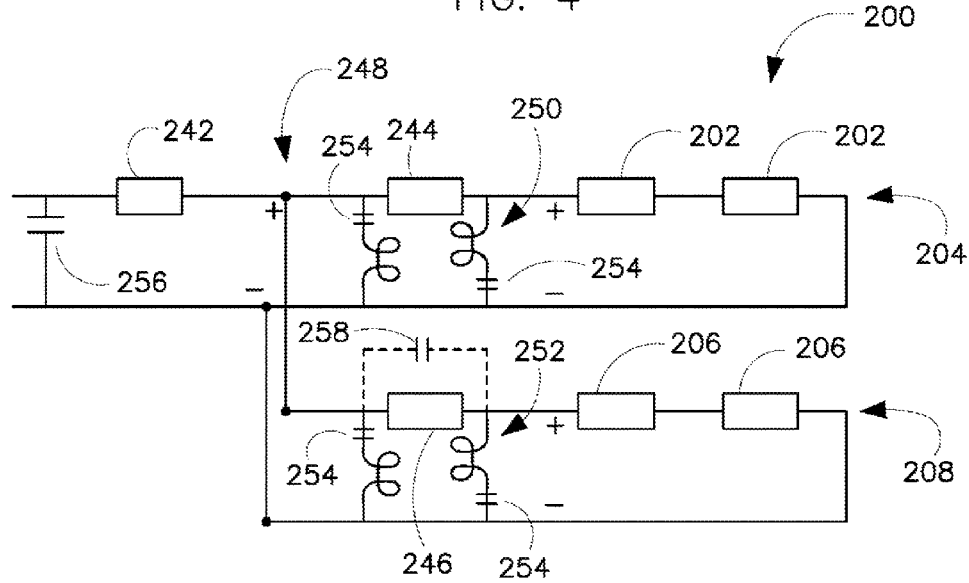
FIG. 4 illustrates a portion of a PV system having capacitors that corresponds to individual strings of the PV system but via a DC/DC converters and a coupling transformer, according to an embodiment of the invention.

In another embodiment, referring to FIG. 4, DC/DC converters are provided for each string 204, 208 and a single AFD 242 is provided to provide system protection. In this embodiment, a first DC-DC converter 244 corresponds to first string 204, and a second DC-DC converter 246 corresponds to second string 208. Instead of stepping up DC-DC voltage in several strings as in FIG. 3, each string in the embodiment of FIG. 4 is stepped up in voltage before being combined at a common node 248. However, in this embodiment, because DC/DC converters in general do not pass AC signals (such as high frequency signals generated in strings 204 or 208 due to an arcing fault), high frequency signals generated within the string are generally prevented from passing to AFD 242. As such, coupling transformers are provided according to the invention that straddle each of the DC-DC converters 244, 246. That is, a first coupling transformer 250 corresponds to first DC-DC converter 244 and a second coupling transformer 252 corresponds to second DC-DC converter 246. Each coupling transformer 250, 252 includes capacitors 254 in order to effectively provide a low impedance path of the high frequency signal generated from a arcing connection onto respective primary and secondary windings. That is, each coupling transformer 250, 252 has legs coupled to the positive and negative terminals thereof having capacitors 254 as illustrated. In such fashion, high frequency signals generated within either string 204, 208 are caused to straddle the respective DC-DC converter 244, 246 because of the presence of their respective DC-DC converter 244, 246, and the high frequency signals also pass through AFD 242 because of the presence of capacitors 254. Further, according to the invention, an additional capacitor 256 can be provided proximate AFD 242 to provide yet an additional low impedance path for high frequency signals emanating from system 200. Thus, in this embodiment a single AFD is provided near the inverter, yet arcs that are on the far side of the DC/DC converter (i.e., on the strings) can be detected. The transformer couples selected AC frequency bands across the DC/DC converter and each leg of the transformer also has a series capacitor to prevent DC current (and losses) though the transformer windings. In an alternate embodiment illustrated in FIG. 4, a bypass capacitor 258 may be used in lieu of coupling transformer 252. Coupling transformer 252, as known in the art, enables high frequency components, such as that generated from an arc fault, to bypass DC-DC converter 246. Thus, capacitor 258, illustrated in phantom, may provide similar functionality by spanning across DC-DC converter 246. Further, although illustrated with respect to second string 208, it is contemplated that a by-pass capacitor (not illustrated) may also be used to bypass DC-DC converter 244 in string 204 as well.

Numerous arrangements for string protection are possible as illustrated in the subsequent FIGS. 5-11. Each system of FIGS. 5-11 include generally components that correspond to FIGS. 1-4 above. However, for simplicity of illustration and discussion, components in FIGS. 5-11 have been subsequently renumbered. Each system 300 of FIGS. 5-11 includes a first string of six PV modules 302 and a second string of six PV modules 304. Outputs from the positive leads of each string 302, 304 meet or combine at a common positive terminal 306, and each string 302, 304 includes also meets or combines at a common negative terminal 308. Common positive and negative terminals include leads to a DC/AC inverter 310, which outputs AC power to a grid or load, as known in the art. The following examples provide a solution with stand-alone capacitors that can be added at various locations to isolate noise sources and to ensure certain or specific paths for high frequency AC noise to travel from the arc fault, to the low impedance capacitor (to guide it through the respective and corresponding AFD). Various embodiments are considered in the following FIGS. 5-11 for providing different zones of protection at different cost points, and provide discrimination of the arcing fault location.

Figure 5:
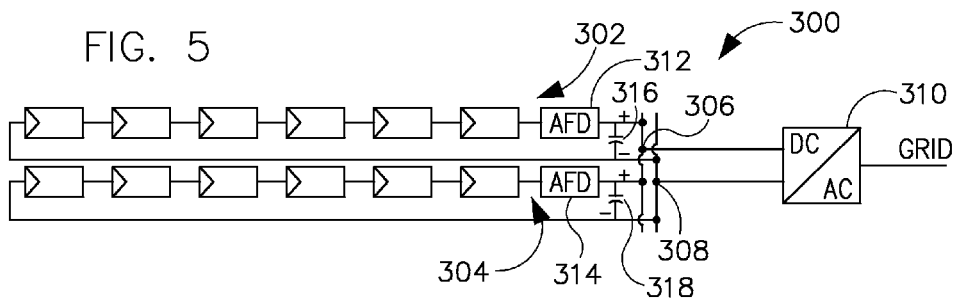
FIG. 5 illustrates an AFD and corresponding capacitor for each string of a PV system, according to an embodiment of the invention.

The embodiment of FIG. 5 is similar to that illustrated and described with respect to FIG. 2 above. First string 302 includes a first AFD 312, and second string 304 includes a second AFD 314. First AFD 312 includes a first capacitor 316 and second AFD 314 includes a second capacitor 318. As such and as discussed with respect to FIG. 2, each string 302, 304 is provided individual arc fault protection with use of their respective AFDs 312, 314, and in each string 302, 304 the high frequency signal generated from a arcing fault therein has a low impedance path with their respective capacitors 316, 318.

Figure 6:
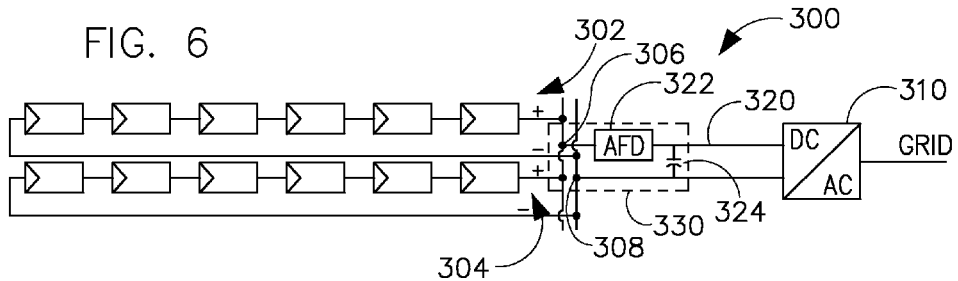
FIG. 6 illustrates an AFD and corresponding capacitor for a combiner box, of a PV system, according to an embodiment of the invention.

The embodiment of FIG. 6 is similar to that illustrated and described with respect to FIG. 3 above. First and second strings 302, 304 combine at common note 306 and then pass power to inverter 310 via a common line 320. However, in this instance common line 320 is also provided with its own AFD 322 that provides arc fault protection for both strings 302, 304. AFD 322 includes a corresponding capacitor 324 that, as described, provides arc fault protection to both strings 302, 304 by effectively providing a low impedance path that high frequency components generated in either string 302, 304 can follow and thus be detected by AFD 322.

Figure 7:
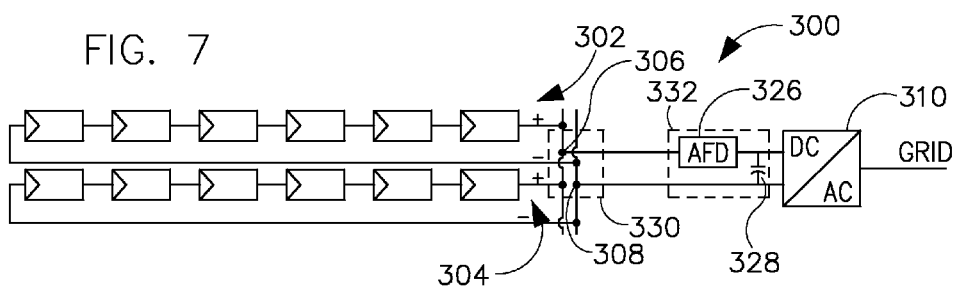
FIG. 7 illustrates an AFD and corresponding capacitor for an inverter box, of a PV system, according to an embodiment of the invention.

The embodiment of FIG. 7 is similar to FIG. 6, however in this embodiment an AFD 326 and its corresponding capacitor 328 are positioned proximate the inverter 310. That is, in the embodiment of FIG. 6, AFD 322 and its capacitor 324 are included within a combiner box 330, but in FIG. 7 AFD 326 and capacitor 328 are positioned outside combiner box 330 and positioned proximate inverter 310. In one embodiment, AFD 326 and capacitor 328 are included within an inverter box 332. Thus the functionality of system protection for arc faults can be provided by providing an AFD with corresponding capacitor within a combiner box (FIG. 6) or as part of an inverter (FIG. 7).

Figure 8:
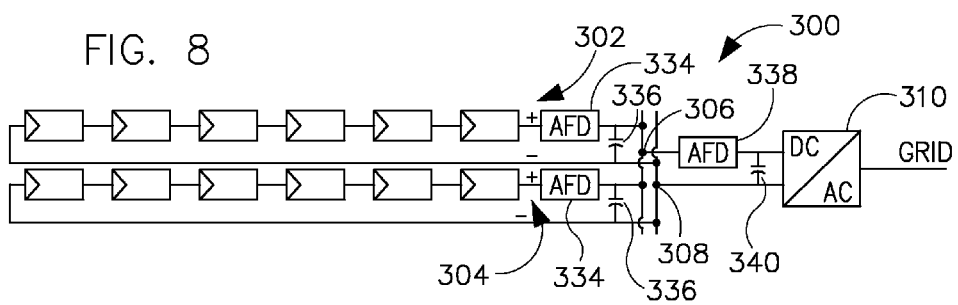
FIG. 8 illustrates an AFD and corresponding capacitor for proving arc fault protection to individual strings and the combined circuit of a PV system, according to an embodiment of the invention.

The embodiment of FIG. 8 illustrates how embodiments of the invention may be combined. FIG. 8 illustrates AFDs corresponding to each string 334 with corresponding capacitors 336 (similar to FIG. 5) along with a AFD 338 and a corresponding capacitor 340. Thus, in this embodiment additional protection is provided in that individual strings have low impedance path via capacitors 336 and overall bus feed system protection is provided as well via a system AFCI 338 and capacitor 340. Because of the different amount of power that typically results between each string 302/304 compared to the overall bus feed, and resulting component design, the necessary size of the capacitors is typically different between locations (each system is different). And, although there is typically no set value established for the capacitance needed to protect the system and respective strings, in one embodiment the capacitance of capacitor 340 is approximately 5 times greater than that of capacitors 336.

Figure 9:
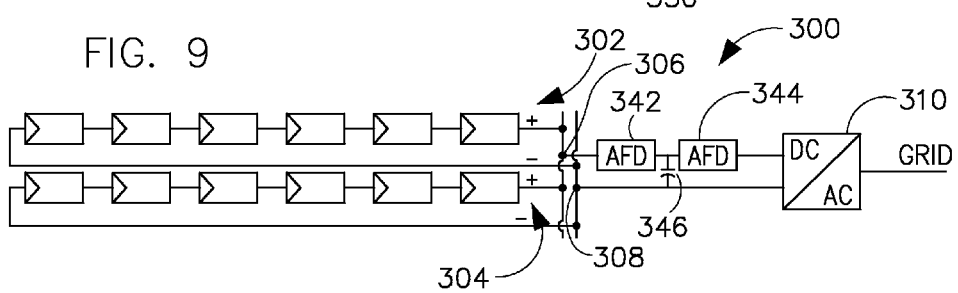
FIG. 9 illustrates two AFDs having a common capacitor to provide string protection and inverter protection of a PV system, according to an embodiment of the invention.

Referring now to FIG. 9, a first AFD 342 and a second AFD 344 are included having a capacitor 346 positioned therebetween. In such fashion, capacitor 346 serves as a low impedance path for high frequency components generated in either the strings 302/304 and thee inverter 310 or electrical connections associated therewith. That is, high frequency components generated in either string 302 or 304 can be caused to flow through AFD 342 because of the presence of capacitor 346, and high frequency components generated in inverter 310 or on the bus feed conductors XYZ can be drawn through AFD 344 via capacitor 346.

Embodiments may be further combined, as illustrated for instance in FIG. 10. FIG. 10 illustrates a first set of strings 348 (which may include two or more than two strings 302, 304) and a second set of strings 350 (which likewise may include two or more than two strings). Each set of strings 348, 350 includes a respective combiner box 352, 354 (illustrated by common nodes 306 as well) that each is protected by its own respective AFD 356 and capacitor 358. As with FIG. 9 as well, FIG. 10 illustrates that one or both additional AFDs 360 with a corresponding capacitor 362 can be included to provide bus feed system protection against arc faults beyond that of the individual strings.

FIG. 11 illustrates yet another embodiment in which AFDs are provided with corresponding capacitors. The first set of bus feeds illustrated 364 shows that, if an arc fault forms 366 at a location between common node 306 and inverter 310, then the resulting high frequency component may be caused to split and flow through each of the respective AFDs 368, 370 because of their corresponding capacitors 372 374. Alternatively, yet a different arrangement may provide protection as shown in the second set of bus feeds 376 where, in lieu of AFDs for each string 378 within first set of bus feeds 364, a single AFD 380 may be provided to protect multiple strings.

The invention is not limited to the embodiments illustrated herein. Numerous arrangements of AFDs and corresponding capacitors are illustrated in FIGS. 2-11, but it is contemplated that other arrangements are possible as well. As discussed, individual strings may be protected, pairs or banks of multiple strings may be combined in a single AFD and corresponding capacitor, and additional bus feed system level protection may be provided to the overall array of PVs as well as to the inverter. Thus, one skilled in the art will recognize the myriad possible combinations of arrangements of AFDs and capacitors that can provide protection specific to components and portions of a PV system, according to the invention.

Thus, arcing causes broadband AC noise in a PV system that is generated on an electrical conductor. Typically the capacitance within system components provides low impedance for the broadband, high frequency AC current. System components such as DC/DC converters, transformers, inductors, and the inverter, as example, can cause the AC signal current at various frequencies to not propagate to/through an arc fault detector (AFD) or arc fault circuit interrupter (AFCI).

An implementation of embodiments of the invention in an example comprises a plurality of components such as one or more of electronic components, hardware components, and/or computer software components. A number of such components can be combined or divided in an implementation of the embodiments of the invention. An exemplary component of an implementation of the embodiments of the invention employs and/or comprises a set and/or series of computer instructions written in or implemented with any of a number of programming languages, as will be appreciated by those skilled in the art.

An implementation of the embodiments of the invention in an example employs one or more computer readable storage media. An example of a computer-readable signal-bearing medium for an implementation of the embodiments of the invention comprises the recordable data storage medium of the image reconstructor 34, and/or the mass storage device 38 of the computer 36. A computer-readable storage medium for an implementation of the embodiments of the invention in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory.

According to one embodiment of the invention a photovoltaic (PV) system includes a string of at least one PV module, and an arc fault detector (AFD) electrically coupled to the string. The AFD is configured to detect a non-DC electrical current that occurs within the string, and cause electrical contacts within the PV system to open as a result of the detected non-DC electrical current. The system includes a capacitor electrically coupled to the string and to the AFD such that the non-DC electrical current passes through the AFD and the capacitor.

According to another embodiment of the invention a method of manufacturing an arc fault detection system for a photovoltaic (PV) detector includes coupling an arc fault detector (AFD) to a string of PV modules, wherein the AFD is configured to cause electrical contacts within the PV system to open if an arc fault is detected, and coupling a capacitor to the AFD and to the string of PV modules such that the high frequency electrical current passes at least in part through the AFD and the capacitor.

According to yet another embodiment of the invention a protective circuit for a photovoltaic (PV) system includes an arc fault detector (AFD) coupled to a first string of PV modules, and a capacitor coupled to the first string of PV modules and to the AFD such that a high frequency broadband electrical current generated in the string of PV modules passes through the AFD and the capacitor.

A technical contribution for the disclosed method and apparatus is that it provides for a computer-implemented apparatus and method of a method for enhancing an arc fault signal for detection in a photovoltaic (PV) system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A photovoltaic (PV) system comprising:
   a string of at least one PV module;
   an arc fault detector (AFD) electrically coupled to the string, the AFD configured to:
      detect a non-DC electrical current that occurs within the string; and
      cause electrical contacts within the PV system to open as a result of the detected non-DC electrical current; and
   a capacitor electrically coupled to the string and to the AFD such that the non-DC electrical current passes through the AFD and the capacitor;
   a first DC/DC converter coupled to a first string of the string of at least one PV module; and
   a first coupling transformer coupled to the first DC/DC converter, wherein the capacitor is a first capacitor positioned within one of a primary and a secondary winding of the first coupling transformer.

2. The PV system of claim 1 wherein the capacitor is positioned within a combiner box of the PV system, the combiner box comprised of inputs from the string of at least one PV module.

3. The PV system of claim 2 wherein the AFD is a first AFD coupled to a second string of at least one PV module, wherein the system further comprises a second AFD coupled to a DC/AC inverter, and the capacitor is coupled to the first AFD and to the second AFD.

4. The PV system of claim 2 wherein the AFD is a first AFD coupled to a first string of the string of at least one PV module and the capacitor is a first capacitor coupled to the first AFD, wherein the system further comprises:
   a second AFD positioned within the combiner box and coupled to a second string of the string of at least one PV module;
   a second capacitor coupled to the second AFD;
   a third AFD coupled to a DC/AC inverter and coupled to each of the first and second strings; and
   a third capacitor coupled to the third AFD.

5. The PV system of claim 2 wherein the system comprises a voltage converter having inputs from one or more strings of the at least one PV module, and wherein the capacitor is coupled to a positive lead of the voltage converter and to positive leads of each of the one or more strings.

6. The PV system of claim 1 comprising a bypass filter capacitor spanning the first DC-DC converter and positioned such that the non-DC electrical current directed toward the DC/DC converter bypasses the DC-DC converter.

7. The PV system of claim 1 comprising:
   a second DC/DC converter coupled to a second string of the string of at least one PV module; and
   a second coupling transformer coupled to the first DC/DC converter, wherein a second capacitor is positioned within one of a primary and a secondary winding of the second coupling transformer.

8. The PV system of claim 7 wherein the AFD is coupled to a positive lead of the first string and to a positive lead of the second string.

9. The PV system of claim 1 wherein the capacitor is electrically coupled to a return line of the string.

10. A method of manufacturing an arc fault detection system for a photovoltaic (PV) detector comprising:
    coupling an arc fault detector (AFD) to a string of PV modules, wherein the AFD is configured to cause electrical contacts within the PV system to open if an arc fault is detected; and
    coupling a capacitor to the AFD and to the string of PV modules such that high frequency electrical current passes at least in part through the AFD and the capacitor;
    coupling a DC/DC converter to the string of PV modules; and
    coupling a bypass filter capacitor to the DC/DC converter such that the high frequency electrical current bypasses the DC/DC converter.

11. The method of claim 10 comprising:
    coupling the AFD to a first string within the string of PV modules;
    coupling a second AFD to a second string within the string of PV modules; and
    coupling a second capacitor to the second string.

12. The method of claim 11 comprising:
    coupling a third AFD to the first string, to the second string, and to a DC/AC inverter; and
    coupling a third capacitor to the third AFD.

13. The method of claim 10 comprising:
    coupling the AFD to a second string of PV modules; and
    coupling the capacitor to the second string of PV modules.

14. The method of claim 10 comprising coupling a coupling transformer to the DC/DC converter, wherein the capacitor is positioned within one of a primary and a secondary winding of the coupling transformer.

15. The method of claim 10, wherein the high frequency electrical current is generated from the arc fault.

16. A protective circuit for a photovoltaic (PV) system comprising:
    an arc fault detector (AFD) coupled to a first string of PV modules; and
    a capacitor coupled to the first string of PV modules and to the AFD such that a high frequency broadband electrical current generated in the string of PV modules passes through the AFD and the capacitor;
    a DC/DC converter coupled to the first string of PV modules;
    a coupling transformer coupled to the DC/DC converter and between a positive lead of the first string of modules and a return line, wherein the capacitor is within one of a primary and a secondary winding of the coupling transformer.

17. The PV system of claim 16 comprising:
    a second AFD coupled to a second string of PV modules; and
    a second capacitor coupled to the second AFD.

18. The PV system of claim 16 comprising a second string of PV modules, wherein the capacitor is coupled to the second string of PV modules;
    further comprising a DC/DC converter coupled to the first string of PV modules and to the second string of PV modules, wherein the capacitor is coupled to the DC/DC converter.

19. The PV system of claim 16 comprising a capacitor coupled to the DC/DC converter such that the high frequency broadband electrical current is caused to bypass the DC/DC converter.

20. The PV system of claim 16, wherein:
   the high frequency broadband electrical current is caused by an arc fault; and
   the AFD is configured to:
      detect the high frequency broadband electrical current; and
      cause electrical contacts within the PV system to open as a result of the detected high frequency broadband electrical current.

\* \* \* \* \*